(12) United States Patent
Brajer et al.

(10) Patent No.: US 11,989,401 B1
(45) Date of Patent: May 21, 2024

(54) CONFIGURABLE BOTTOM SCREEN DOCK FOR MOBILE AND ELECTRONIC DEVICES (VIRTUAL SCREENS INCLUDED)

(71) Applicants: Luis Alberto Brajer, Caba (AR); Matias Leonel Baqué, Caba (AR)

(72) Inventors: Luis Alberto Brajer, Caba (AR); Matias Leonel Baqué, Caba (AR)

( * ) Notice: Subject to any disclaimer, the term of this patent is extended or adjusted under 35 U.S.C. 154(b) by 0 days.

(21) Appl. No.: 18/373,499

(22) Filed: Sep. 27, 2023

Related U.S. Application Data

(60) Provisional application No. 63/448,541, filed on Feb. 27, 2023.

(51) Int. Cl.
*G06F 3/048* (2013.01)
*G06F 3/04842* (2022.01)
*G06F 3/04845* (2022.01)

(52) U.S. Cl.
CPC ...... *G06F 3/04845* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 2012/0185805 A1* | 7/2012 | Louch | G06F 3/04812 715/862 |
| 2015/0067596 A1* | 3/2015 | Brown | G06F 3/04883 715/808 |
| 2015/0220242 A1* | 8/2015 | Guest | G06F 3/0354 715/740 |
| 2015/0346976 A1* | 12/2015 | Karunamuni | G06F 3/04842 715/765 |
| 2017/0109011 A1* | 4/2017 | Jiang | G06F 3/04883 |
| 2018/0335936 A1* | 11/2018 | Missig | G06F 3/04883 |
| 2018/0335939 A1* | 11/2018 | Karunamuni | G06F 3/0481 |
| 2023/0059021 A1* | 2/2023 | Killian | G06F 40/14 |

\* cited by examiner

*Primary Examiner* — Linh K Pham
(74) *Attorney, Agent, or Firm* — Mariana I. Vernieri

(57) ABSTRACT

The present invention is a configurable bottom screen dock for mobile and electronic devices, including virtual screens, which is always visible on the screen and can display a wide range of content, such as advertising, entertainment, and information. The dock is made up of three or more lines of pixels from the base or lowest line of pixels of the screen and is completely configurable in size. The dock remains constantly visible regardless of the function and/or application that the terminal is running. The content is generated by the operating company's servers and is sent through the communication link to the terminals where the dock is installed. The dock runs the specific content separate from other communications and activities on the device, providing an enhanced user experience.

8 Claims, 2 Drawing Sheets

CONFIGURABLE BOTTOM SCREEN DOCK FOR MOBILE AND ELECTRONIC DEVICES (VIRTUAL SCREENS INCLUDED)

TECHNICAL FIELD

The invention relates to mobile and electronic devices and more particularly to a configurable bottom screen dock for such devices, including Virtual Screens.

BACKGROUND OF THE INVENTION

Mobile and electronic devices, such as smartphones and tablets, have become an integral part of our daily lives. These devices are used for a wide range of tasks, including communication, entertainment, and information access. Current mobile and electronic devices have limitations regarding quick accessibility to important information and key functions.

Currently, several mechanisms exist for accessing certain features and functions on mobile and electronic devices. One of them is the top of the screen, which is often used to display important information such as the time, battery charge, carrier details, and other system notifications. This approach, while functional, has constraints regarding the volume and variety of displayable information.

Other alternatives encompass pull-down notification bars, side-scrolling docks, and home screen widgets. However, these solutions are hindered by a major disadvantage: they are not constantly visible on the screen. For instance, pull-down notification bars are only visible when the user swipes down from the top of the screen, and home screen widgets are only visible when the user is on the home screen. Existing solutions, such as dropdown notification bars and home screen widgets, are not constantly visible and require interrupting the user's current task to access them.

This can be problematic for users who need quick access to certain information or features, as it requires them to navigate away from their current task, which can be time-consuming and disruptive. Additionally, these solutions are also limited in terms of the information that can be displayed.

The implications extend to the advertising domain as well. Conventional advertising mediums, like specific applications or push notifications, often intrude upon the user's experience. However, a constantly visible dock on the bottom of the screen can provide a less invasive and more powerful advertising channel. No current existing permanently visible dock can display a wide range of content, including advertising, and can be used for novel communication systems and majority decision-making, without interrupting the user's current task, providing a continuous exposure to the advertised messages.

An invention that addresses these challenges by providing a configurable bottom screen dock that is always visible on the screen, regardless of the current task or application being used, and in which the dock can be configured to display a wide range of content, including advertising, entertainment, and information, and can be used for novel communication systems and majority decision-making, allowing users to access the information they need quickly and easily, without interrupting their current task, would constitute a great advancement to the field.

SUMMARY OF THE INVENTION

The present invention introduces a configurable bottom dock for mobile and electronic devices, including virtual screens. Designed to rectify the shortcomings of existing solutions, this dock ensures uninterrupted, swift access to vital information and functions. The configurable dock offers a novel and versatile solution for displaying content, such as advertisements, entertainment, and information, without interrupting the user's current task. The dock is made up of one or more lines of pixels, with a minimum standard size of 3% of the size of the screen when minimized. The dock is completely configurable in size, from the base or lowest line of pixels of the screen to the top, respecting its minimums. With flexibility in configuration, its placement varies: it assumes the screen's foremost line for non-Android devices and situates below the operating system keys for Androids. The dock is a software application that is installed or not on the device's updatable operating system. The collaborative interaction of the screen dock, the application, and the mobile operator enables the creation of a communication link on a different and independent plane that will enable content such as advertising and entertainment in audio, text, and/or audiovisual format, information/alerts/trivia in audio, text, and/or audiovisual format, implementing novel communication systems, and a solidarity network/majority decision-making (like change.org). These contents will run within the dock at the disposal of the receiver regardless of any other function running on the device where the dock is installed.

The Configurable Bottom Screen Dock provides a solution that is always visible on the screen, regardless of the active application. This uninterrupted visibility allows users to quickly access relevant information and important functions at any moment they need it. Furthermore, the dock offers a new, less invasive, and more effective promotional platform for advertisers.

The Configurable Bottom Screen Dock is composed of one or more lines of pixels with a minimum standard size of 3% of the screen's size. The dock is fully configurable in size and is positioned as the first line on the screen for non-Android devices. The content is displayed on the dock in audio, text, and/or audiovisual format. The Configurable Bottom Screen Dock is technically feasible for implementation on various mobile and electronic devices, including virtual screens. The software application installed on the operating system allows smooth interaction with the content without affecting other functions of the device.

The location of the dock in the lower part of the screen has several advantages over other locations, which go well beyond a design choice. For example, the bottom placement proves less invasive, and distracting compared to top, floating, or lateral docks. This fact can be checked by testing dock positions and questioning users about their impressions. Findings will teach that users find a dock in the bottom of the screen less invasive and distracting than docks of similar sizes in different positions. Besides, in the case of touch screens, easy access to the dock with the thumbs brings about ergonomic advantages, making it more usable, quick, and user-friendly. Its maximization feature, which enlarges the usable space of the dock with the click or tap of a button or a simple interaction gesture like swiping up, facilitates a more comfortable user interaction for tasks such as editing or copy-pasting, while a simple minimization restores its original position by another click, tap, or swipe down. The fact that the minimized dock is visible at all times, irrespective of which app is currently active, has important practical applications like, for example, behaving as a note taking device which allows the user to read, copy and paste content directly from the dock without the need of app-switching to do so.

Suitable for a range of devices—cell phones, tablets, browsers, and VR screens—the dock's adaptability makes it ideal for sectors like advertising, entertainment, communication, and decision-making platforms.

In sum, the Configurable Bottom Screen Dock for mobile and electronic devices represents a significant advancement in the accessibility and display of relevant information. Its implementation creates new opportunities for advertising, communication, and majority decision-making, enhancing the user experience and providing a powerful tool for advertisers and users alike.

DETAILED DESCRIPTION AND BEST MODE OF IMPLEMENTATION

Figure 1:
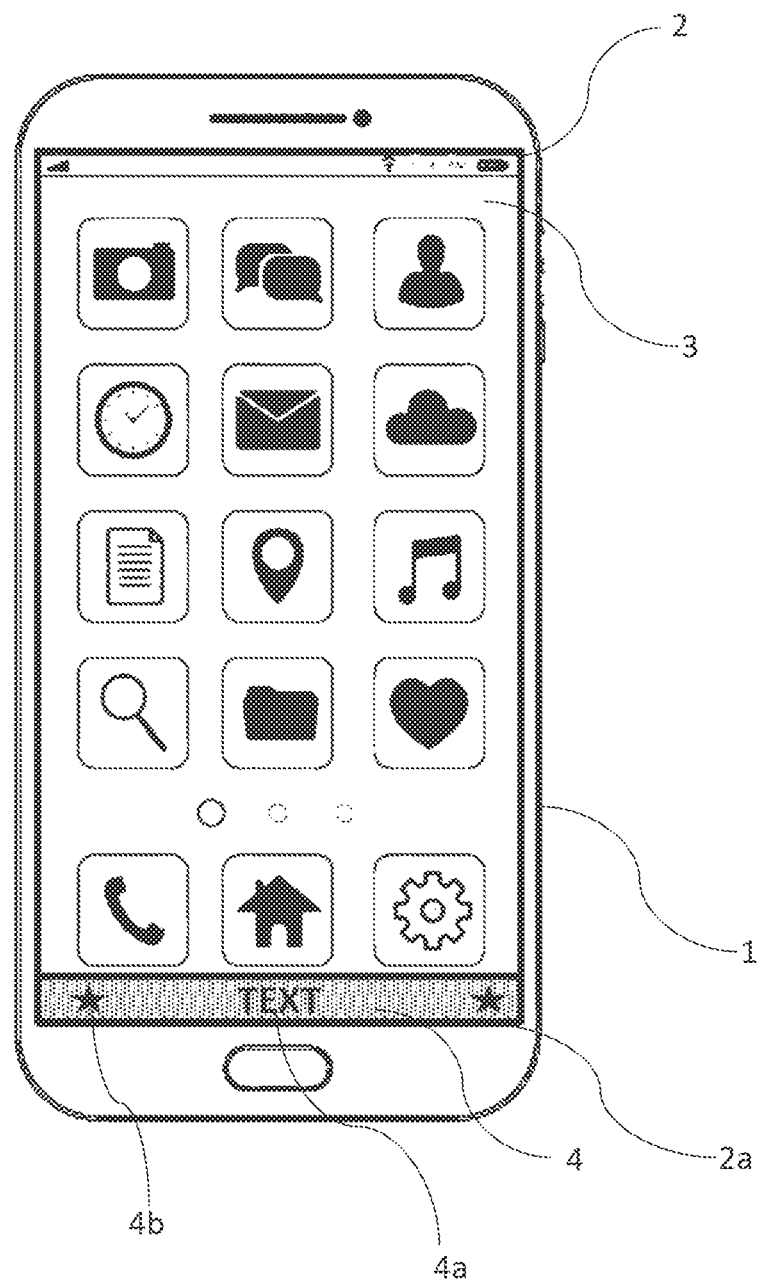
FIG. 1 is a schematic view of an embodiment of the configurable bottom screen dock in accordance with the present invention.

This invention relates to a configurable bottom screen dock suitable for both virtual and traditional mobile and electronic devices. The dock comprises one or more lines of pixels, with a minimum standard size of 3% of the size of the screen and is completely configurable in size. Regardless of the active function or application on the device, the dock remains consistently visible. On non-Android devices, the dock is positioned as the screen's bottommost line, while for Android devices, it's found below the operating system keys. The dock is used to display content such as advertising and entertainment in audio, text, and/or audiovisual format, information/alerts/trivia in audio, text, and/or audiovisual format.

One of the possible manifestations of this dock is through a mobile application (app) designed to manage the notifications that a mobile device user receives on a daily basis. This app's core intention is to present system-configured notifications more discreetly and privately. In achieving this, it aims to offer user comfort, minimize disruption from incoming notifications, and ensure user privacy by concealing notification content, even with an active display. It is important to note that this app is only one of many ways in which the dock can be implemented. While this description delves deeper into this app's specifics, it does not negate other potential applications as illuminated by this specification for those skilled in the art.

This invention also considers native integrations that involve the deep integration of the configurable lower screen dock in mobile and electronic device operating systems. These native integrations enable closer collaboration with system resources, user interface management, and device security, leading to improved efficiency and consistency in the operation of the dock. In these native integrations, the configurable lower screen dock is integrated directly into the device's operating system, enabling quicker and optimized access to the dock's functionality. Device operating systems like Android and iOS can incorporate the dock as a native feature, which means the dock is an integral part of the system and doesn't require the installation of a separate application. This ensures greater stability and performance. Furthermore, native integration provides greater control over the visibility and interaction of the dock, which can be beneficial for both users and advertisers. Operating systems can manage the priority and visibility of content in the dock more effectively, ensuring that users receive relevant information in a non-intrusive manner. In terms of security, native integrations enable enhanced protection of the dock's integrity and its content. Operating systems can implement more robust security measures to safeguard the dock from potential external threats. In summary, these native integrations represent an extension of the present invention and offer greater potential to enhance the user experience and provide new opportunities for communication, entertainment, and decision-making. The native integration of the configurable lower screen dock in mobile and electronic device operating systems is a distinctive feature of the invention that expands its scope and applicability.

In the case of virtual screens, the invention opens the doors to integrating the dock into different kinds of virtual screens, such as those used in virtual or augmented reality, offering users an immersive experience. In this environment, the dock merges with the virtual world, providing quick and effortless access to critical information and essential functionalities. This solution is not limited to PCs and mobile devices, but extends to IoT devices, such as smart home gadgets and wearables, where the dock could simplify access to key functionalities without the need for separate applications. From a technical feasibility perspective, this embodiment could be implemented using the Flutter development framework. Flutter is a mobile app development platform that enables the creation of native applications for Android and iOS from a single codebase written in the Dart programming language. Utilizing Flutter would ensure that the dock is available on multiple platforms, including Android and iOS, as an application that users can download from their respective application stores. This ensures optimal efficiency and compatibility with the major mobile platforms, allowing a broad audience to enjoy the benefits of the dock seamlessly. In summary, this invention is highly flexible and adapts to a wide range of devices and platforms, with its technical feasibility strongly supported by the use of the Flutter framework in its development.

Definitions

Use Case: A use case is an artifact that defines a sequence of actions leading to an observable valuable outcome. Use cases provide a structure for expressing functional requirements in the context of business and system processes. Use cases can be represented as a graphical element on a diagram and as a use case specification in a written document.

User Journey: The user journey is a tool that enables exploration of the user's behavior from their own perspective before, during, and after he interacts with the functionality. It pinpoints processes and activities that occur simultaneously in the service while the experience is being developed, and to identify critical moments in the user's experience, which ultimately are the main issues to address.

User Stories: A user story is a general and informal explanation of a software feature written from the perspective of the end-user. Its purpose is to determine how a particular functionality will provide value to the customer. User stories should be accompanied by functional acceptance criteria to flesh out detailed needs and requirements.

| ID | Screen | Functionality | User Stories | Acceptance Criteria |
|---|---|---|---|---|
| 1 | Configuration | Allowing notifications | As a regular user of my device, I want the ability to enable or disable the receipt of notifications to control their usage according to my current situation. | The configuration should have two options: enabled or disabled. For both cases, the dock should display a textual message informing the user what it will do when activated or deactivated. The dock should display only the notifications that are enabled according to the native settings of the operating system. In a second instance, the settings of the originating applications from which the notifications come should be respected and maintained. For example, if WhatsApp notifications do not show the message, the 3 px app will also not show the message. To ensure proper notification management, the phone should set to 'Do Not Disturb' mode. By default, it should be displayed as disabled when the app is downloaded. The user should be presented with an onboarding to explain the use of the functionality. The user should be required to read and accept the Terms and Conditions for using the app. The use of the app should be enabled only after the user accepts the Terms and Conditions. |
| 2 | Configuration | Configuring notification size | As a regular user of my device, I want the ability to configure the size the notification is displayed to adjust it according to my preferences. | The user should be able to choose between two display formats: one that occupies only 24 px of the screen and another that occupies 48 px. By default, the 48 px mode should be configured. After completing the inital configuration, a success message should be displayed. |
| 3 | General | Displaying notifications | As a regular user of my device, I want to see the notifications I receive in the format I have configured while navigating on any screen, so that I can stay informed about updates and news. | If the app is active and my device is locked, no notifications should be displayed. The notification should be displayed for only 5 seconds, and it should show its origin message. The user should have the option to view notifications at the bottom of the screen. The notification should not interrupt the action or task being executed. After the notification time expires, advertisements should be displayed. |
| 4 | General | Hiding notifications from others when screen sharing | As a regular user of my device, I want the notifications I receive to be hidden when I am screen sharing, so that other participants cannot see them. | When screen sharing, only I should be able to see the information of the notification. The viewers of my screen should only see a black box at the bottom corner of the screen. |
| 5 | General-48 px mode | Displaying notification content upon pressing it | As a regular user of the application, I want an extended message to be automatically displayed when I tap on the notification, so that I can understand what it is about. | It should be automatically shown upward. When I press the notification, it should expand and occupy 64 px. |
| 6 | General-48 px mode | Showing the list of notifications upon swiping on it | As a regular user of my device, I want the ability to swipe left to view the next notifications, so that I can see all of them. | They should be shown sliding to the left. Once the notifications finish displaying, advertisements should be show. |

-continued

| ID | Screen | Functionality | User Stories | Acceptance Criteria |
|----|--------|---------------|--------------|---------------------|
| 7 | General | Redirecting to the app where the notification originated | As a regular user of my device, I want the notification to take me to the application it originates from when I press it, to perform some action | If I press the notification, I should be redirected to the app it directs to. |
| 8 | General-24 px mode | Expanding notifications | As a regular user of my device, I want the ability to expand notifications to understand what they are about without opening them. | When swiping upwards, the displayed information should be expanded. |
| 9 | General-24 px mode | Displaying the list of notifications | As a regular user of my device, I want to view multiple notifications in the form of a list if I receive more than one, so that I don't miss any of them. | As the notifications are opened, they should disappear from the list. If there are multiple notifications, they should be displayed consecutively in a list that extends upward, with the newest notification at the top of the list and the oldest at the bottom. |
| 10 | Advertisements | Redirecting to the notification's advertisement | as the owner of the application, I want the user to be redirected to the advertiser's page when clicking the advertisement, to allow effective monetization. | If I press on an advertisement, it should redirect me to the website of the sponsoring company. |

KPIs: A Key Performance Indicator (KPI) is a quantitative metric used to measure the performance and success of a system, application, process, or technological infrastructure in relation to established goals. Within the technological realm, KPIs are indispensable for assessing and overseeing the performance of tech-driven activities.

Technological KPIs primarily gauge the efficiency and effectiveness of tech systems and processes against set benchmarks. They furnish tangible insights regarding system operation, service uptime, responsiveness, scalability, security, and other pivotal technological facets.

Harnessing KPIs in technology offers a slew of advantages. They serve as a diagnostic tool, pinpointing operational issues and prompting timely interventions. Further, KPIs supply data essential for strategic tech-related decisions, guiding technology investments, resource allocation, and continuous improvement of systems.

A salient advantage of tech KPIs is their role in bridging technological targets with an organization's business aspirations. Clear metrics and objectives ensure technology propels business aims and guarantees resourceful technological resource deployment.

Furthermore, KPIs foster accountability and transparency within the tech team, as they lay down measurable performance standards and enable the evaluation at both individual and group levels, thus driving the continuous improvement of technological processes and the optimization of resources.

Illustrative KPIs:
1. Number of application downloads.
2. Number of users who enable the functionality.
3. Number of users who accepted the Terms and Conditions.
4. Percentage of users who withdrew during the Terms and Conditions stage.
5. Percentage of users who configured each mode.
6. Number of users who reached the end of the journey.
7. Conversion rate at the end of the journey.

Architecture: A feasible architecture for the dock as embodied on a mobile app utilizes the Flutter development framework, tailored to managing notifications on Android and iOS devices. This choice has several key advantages that Flutter offers in mobile application development.

Firstly, Flutter stands out for its cross-platform development capability. The creation of a single codebase for both platforms (Android and iOS) simplifies the development and maintenance process. This eliminates the need to maintain two separate applications and ensures a consistent user experience across both platforms.

Furthermore, Flutter offers a set of highly customizable and flexible widgets. These widgets allow designing appealing user interfaces tailored to the specific needs of the application. For a notification management application, this flexibility is crucial in creating a smooth and pleasant user interface.

Another crucial aspect is the response's performance and speed. Flutter uses the Dart programming language and its own rendering engine, ensuring fast and smooth performance. For a notification management application, this responsiveness is essential, as users expect a seamless and delay-free experience.

Flutter also excels in its extensive compatibility with native plugins and native APIs. This feature facilitates integration with specific operating system functionalities, such as push notification management, camera access, and interaction with other device applications. In a notification management application, this integration capability is crucial for efficient access to device functionalities. While this is just one of many possible architectures it is hereby disclosed as the preferred way of implementation.

Some general aspects of the present invention have been summarized so far in the previous sections of this disclosure. Hereinafter, a detailed description of the invention as illustrated in the drawings will be provided. While some aspects of the invention will be described in connection with these drawings, it is to be understood that the disclosed embodiments are merely illustrative of the invention, which may be embodied in various forms. The specific materials, methods, structures, and functional details disclosed herein are not to be interpreted as limiting. Instead, the intended function of this disclosure is to exemplify some of the ways—including the presently preferred ways—in which the invention, as defined by the claims, can be enabled for a Person of Ordinary Skill in the Art. Therefore, the intent of the present disclosure is to cover all variations encompassed within the spirit and scope of the invention as defined by the appended claims, and any reasonable equivalents thereof.

Referring to the drawings in more detail, FIG. 1 illustrates an embodiment of the configurable bottom screen dock (4) per the present invention. The figure shows an electronic device (1), exemplified by a cellphone, but it could also a be tablet or another kind of electronic device, including virtual devices. The electronic device (1) has a screen (2), a general content part of the screen (3), a dock (4), and dock content (5). The dock (4) is located at the bottom of the screen (2) and is made up of one or more lines of pixels, with a minimum standard size of 3% of the size of the screen (2). The dock (4) is completely configurable in size, from the base or lowest line of pixels of the screen (2) to the top, respecting its minimums. For Android devices, for instance, the dock (4) is situated as the primary line (2a) underneath the operating system keys. The content displayed in the dock (4) encompasses text (4a) and images (4b)

Figure 2:
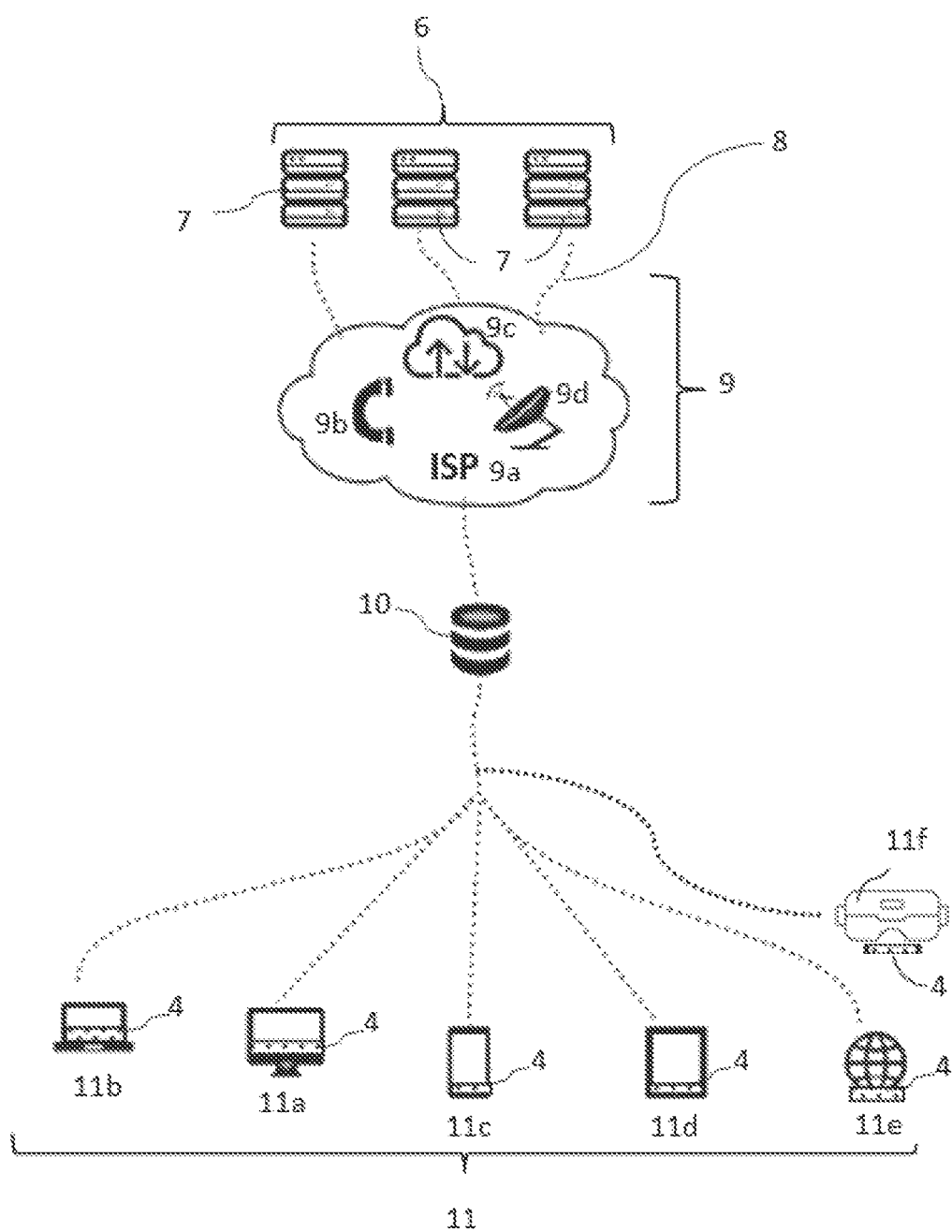
FIG. 2 is a diagram illustrating the communication flow of the configurable bottom screen dock in accordance with the present invention.

FIG. 2 illustrates the communication flow of the configurable bottom screen dock (4). The message starts from the Source (6), which is the operating company. Its servers (7) link with channel servers (9) (ISPs) to connect with terminals (10)) equipped with the dock (4). The Channel (9) encompasses: Internet Service Providers (9a), Telephony (9b). Internet (9c). Satellite (9d), and other future and alternative channels. Lastly, the receptor (11) is the installed dock (4), installed on different devices such as: PC (11a), Laptop (11b), Tablet (11c), cellphone (11d), browsers (11e) such as Internet Explorer, Firefox, Chrome or Safari, or VR Devices or Screens (11f)

The content that will be displayed within the dock (4) is generated by the operating company's servers (Source), These servers, through a wireless connection (8), communicate with the channel servers (ISPs) (9) to reach the terminals (10) with the installed dock (4). The content is then displayed within the dock (4) on the lower part of the screen (2) and remains independent of any other function or application that may be running on the device (11a-f). The dock (4) is constantly active and runs the specific content (5) separate from the other communications and activities on the device (11a-f) providing the user with an enhanced experience and additional functionality. The user can interact with the content displayed in the dock (4), e.g., by clicking on a link, and that interaction will be logged by the servers (7), triggering corresponding actions, such as redirecting the user to a website or showing more information.

Additionally, FIG. 2 also illustrates how the content flows from the Source (6) to the receptors (11). The servers (7) of the Source (6) generate the content which is then sent through the communication link established between the dock (4), app and mobile operator to the terminals (10) where the dock (4) is installed. The content is then displayed within the dock (4) on the lower part of the screen (2) as shown in FIG. 1. If we consider the screen (2) as having a bottom line and a top line, and a screen height defined as the distance between the bottom line and the top line; the dock (4) begins at the bottom line of the screen (2), and it has an adjustable height ranging from a minimum standard height of 3% to the screen height.

Furthermore, the dock (4) is constantly active and runs the specific content (5) separate from the other communications and activities on the device (11a-f) as shown in FIG. 1. This ensures that the user is not interrupted or distracted by other communications or activities while interacting with the content displayed in the dock (4). The user can interact with the content displayed in the dock (4) as mentioned before and that interaction will be registered by the servers (7) and the appropriate action will be taken, such as redirecting the user to a website or showing more information. This interaction flow is also illustrated in FIG. 2 where the information flows from the Source (6) through the communication link (9) to the terminals (10) with the dock (4) installed and the receptors (11) can interact with the content displayed in the dock (4).

The description as set forth is not intended to be exhaustive or to limit the invention to the precise form disclosed. Many modifications and variations are possible in light of the teachings above without departing from the spirit and scope of the forthcoming claims.

The invention claimed is:

1. A configurable bottom screen dock system, comprising:
   a. an electronic device featuring a screen, said screen having a bottom line and a top line, and a screen height defined as the distance between the bottom line and the top line;
   b. a dock beginning at the bottom line of the screen, said dock comprising at least one line of pixels, said dock having an adjustable height ranging from a minimum standard height to the screen height;
   c. content displayable within said dock including advertising, entertainment, information, novel communication systems and majority decision-making; and
   d. communication means for receiving content from an external source to be displayed within said dock;
   wherein the dock is constantly visible on the screen, regardless of the current task or application being used, displaying content separately from other functions or applications running on the electronic device.

2. The configurable bottom screen dock system of claim 1, wherein said minimum standard height is 3% of the screen height, and the adjustable height of the dock is entirely configurable by a user.

3. The configurable bottom screen dock system of claim 1, wherein the electronic device is selected from the group consisting of: cellphones, tablets, personal computers, laptops, virtual reality devices, and browsers.

4. The configurable bottom screen dock system of claim 1, further comprising:
   a. servers for generating content to be displayed within the dock; and
   b. communication channels for transmitting the generated content from said servers to the dock through wireless connections.

5. The configurable bottom screen dock system of claim 4, wherein the communication channels comprise Internet Service Providers, Telephony, Internet, Satellite, and other future and alternative channels.

6. The configurable bottom screen dock system of claim 1, wherein said electronic device is and Android device having operating system keys, and said dock is positioned below said operating system keys.

7. A method for displaying and interacting with content via a configurable bottom screen dock system on an electronic device, said configurable bottom screen dock system comprising:

an electronic device featuring a screen, said screen having a bottom line and a top line, and a screen height defined as the distance between the bottom line and the top line;

a dock beginning at the bottom line of the screen, said dock comprising at least one line of pixels, said dock having an adjustable height ranging from a minimum standard height to the screen height;

content displayable within said dock including advertising, entertainment, information, novel communication systems and majority decision-making text and images; and communication means for receiving content from an external source to be displayed within said dock;

said method comprising the steps of:

a. configuring the size and position of the dock on the screen;

b. receiving advertising, entertainment, information, novel communication systems and majority decision-making content generated from an external source; and c. displaying said advertising, entertainment, information, novel communication systems and majority decision-making content within the dock;

wherein the dock is constantly visible on the screen, regardless of the current task or application being used, displaying content separately from other functions or applications running on the electronic device.

8. A configurable dock system for virtual screens, comprising:

a. a virtual screen interface;

b. a dock merged within said virtual screen interface providing quick access to information and functionalities;

c. content displayable within said dock, including advertising, entertainment, information, novel communication systems and majority decision-making; and d. communication means for receiving content from an external source to be displayed within said dock;

wherein said dock is constantly visible on the virtual screen, regardless of the current task or application being used, displaying content separately from other functions or applications running on the virtual and augmented reality environments.

\* \* \* \* \*